(12) United States Patent
Jun et al.

(10) Patent No.: US 12,140,284 B2
(45) Date of Patent: Nov. 12, 2024

(54) LAMP FOR VEHICLE

(71) Applicant: HYUNDAI MOBIS CO., LTD., Seoul (KR)

(72) Inventors: Na Ram Jun, Yongin-si (KR); Tae Wan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/197,024

(22) Filed: May 12, 2023

(65) Prior Publication Data

US 2024/0240768 A1 Jul. 18, 2024

(30) Foreign Application Priority Data

Jan. 13, 2023 (KR) .......................... 10-2023-0005626

(51) Int. Cl.
*F21S 41/265* (2018.01)
*F21S 41/20* (2018.01)
*G02B 3/00* (2006.01)
*G02B 19/00* (2006.01)

(52) U.S. Cl.
CPC .......... *F21S 41/265* (2018.01); *F21S 41/285* (2018.01); *G02B 3/0056* (2013.01); *G02B 19/0047* (2013.01)

(58) Field of Classification Search
CPC ...... F21S 41/25–285; F21S 41/30–395; G02B 3/0037–0068; G02B 19/0047–0066
See application file for complete search history.

(56) References Cited

U.S. PATENT DOCUMENTS

| | | | | |
|---|---|---|---|---|
| 10,591,126 | B2 * | 3/2020 | Mandl | F21S 41/322 |
| 11,047,543 | B1 * | 6/2021 | Potter | F21S 41/36 |
| 11,359,787 | B2 * | 6/2022 | Lee | F21S 43/15 |
| 11,608,955 | B2 * | 3/2023 | Choi | F21S 41/147 |
| 2021/0080736 | A1 | 3/2021 | Magness | |
| 2021/0215314 | A1 | 7/2021 | Schreiber | |
| 2021/0325016 | A1 | 10/2021 | Moser | |

FOREIGN PATENT DOCUMENTS

| | | |
|---|---|---|
| CN | 104100909 | 10/2014 |
| EP | 3608585 | 2/2020 |
| EP | 3792683 | 3/2021 |
| EP | 3864342 | 8/2021 |
| EP | 3879313 | 9/2021 |
| EP | 3982037 | 4/2022 |

OTHER PUBLICATIONS

Extended European Search Report dated Nov. 23, 2023 issued in EP Application No. 23174201.6.

* cited by examiner

*Primary Examiner* — Jason M Han
(74) *Attorney, Agent, or Firm* — DLA Piper LLP US

(57) ABSTRACT

A lamp for a vehicle. The lamp includes a light emitting part that emits light, a light condensing part that guides the light emitted from the light emitting part such that the light becomes parallel light, and a refraction part that refracts the light emitted from the light condensing part, the refraction part includes a plurality of refraction portions that refracts the light emitted from the light condensing part such that the light is parallel to a light emission direction, and the refraction portions are arranged along an arrangement direction that is a direction that crosses the light emission direction.

9 Claims, 7 Drawing Sheets

LAMP FOR VEHICLE

CROSS-REFERENCE TO RELATED APPLICATION

This application claims the benefit of priority to Korean Patent Application No. 10-2023-0005626, filed in the Korean Intellectual Property Office on Jan. 13, 2023, the entire contents of which are incorporated herein by reference.

TECHNICAL FIELD

The present disclosure relates to a lamp for a vehicle.

BACKGROUND

In general, a vehicle is equipped with various lamps for a vehicle having a lighting function for easily identifying a target located around the vehicle during nighttime driving, and a signal function for informing other vehicles or road users of a driving state of the vehicle.

For example, a low beam lamp is mainly directed to a lighting function, and is directed to a winker signal function.

In recent years, low beam lamps having an adaptive driving beam (ADB) function have been developed. The ADB function refers to a function of making a part, in which dazzling of a counterpart driver may occur, selectively dark when a vehicle appears on a front side or an opposite side of a host vehicle while the host vehicle maintains a high beam state during nighttime driving.

In general, to implement the ADB function, a device, such as a collimator or a reflector, for adjusting an orientation angle of light such that the light is directed at a specific orientation angle is provided. Furthermore, a lens for finishing a beam pattern is disposed on a front side thereof.

Meanwhile, because a contrast of a desired part should be adjusted to implement the ADB function, it is difficult to implement the function when the light is scattered through the lens. This is also the same when a hot zone is formed through the lamp.

Accordingly, in general, when a lens part having an optic in a form of a transverse stripe and longitudinal stripe, which is used in a signal lamp and the like is used, a degree of freedom of a shape of the lens is low.

SUMMARY

The present disclosure has been made to solve the above-mentioned problems occurring in the prior art while advantages achieved by the prior art are maintained intact.

An aspect of the present disclosure provides a lamp for a vehicle that is advantageous for implementing an ADB function.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light emitting part that emits light, a light condensing part that guides the light emitted from the light emitting part such that the light becomes parallel light, and a refraction part that refracts the light emitted from the light condensing part, the refraction part includes a plurality of refraction portions that refracts the light emitted from the light condensing part such that the light is parallel to a light emission direction, and the refraction portions are arranged along an arrangement direction that is a direction that crosses the light emission direction.

In another example, the light condensing part may include a first light condensing member that guides the light emitted from the light emitting part such that the light become the parallel light along a first direction, and a second light condensing member that guides the light emitted from the light emitting part such that the light becomes the parallel light along a second direction that is different from the first direction.

In another example, the second light condensing member may be disposed in the arrangement direction of the first light condensing member.

In another example, a first refraction portion that is any one of the plurality of refraction portions may be configured to refract the light emitted from the first light condensing member such that the light is parallel to the first direction, and a second refraction portion that is another one of the plurality of refraction portions may be configured to refract the light emitted from the second light condensing member such that the light is parallel to the second direction.

In another example, the number in, among the plurality of refraction portions, refraction portions pertaining to the first refraction portion extend, may correspond to the number in which, among the plurality of refraction portions, refraction portions pertaining to the second refraction portion extend, correspond to each other.

In another example, a direction, in which the first refraction portion extends, may be parallel to the first direction, and a direction, in which the second refraction portion extends, may be parallel to the second direction.

In another example, directions of, among the plurality of refraction portions, refraction portions pertaining to the first refraction portion may correspond to each other, and directions of, among the plurality of refraction portions, refraction portions pertaining to the second refraction portion may correspond to each other.

In another example, when an irradiation area formed when the light irradiated from the light emitting part passes through the first light condensing member and the first refraction portion is defined as a first irradiation area, and when an irradiation area formed when the light irradiated from the light emitting part passes through the second light condensing member and the second refraction portion is defined as a second irradiation area, a portion of the first irradiation area may overlap the second irradiation area.

In another example, an angle between the first direction and the second direction may be 0.5 degrees to 10 degrees.

In another example, the refraction part may be a fly eye lens.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
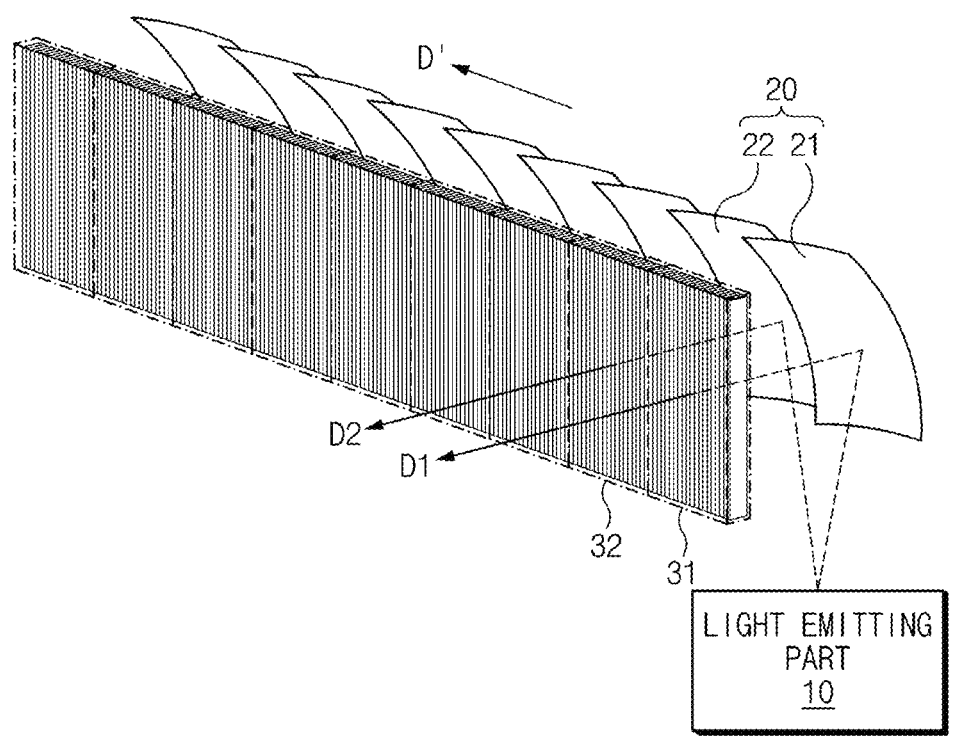
FIG. 1 is a view conceptually illustrating a lamp for a vehicle according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

A lamp according to an embodiment of the present disclosure relates to a lamp that may be used in a vehicle. As an example, the lamp for a vehicle may be a headlamp. As an example, the lamp for a vehicle may be a lamp for irradiating a low beam. However, the present disclosure is not limited thereto, and it is apparent that the lamp according to the embodiment of the present disclosure may be applied to lamps of various fields, such as a rear lamp.

Forward/rearward, leftward/rightward, and upward/downward directions in the specification are referred for convenience of description, and may be directions that are perpendicular to each other. However, the directions are determined relative to a direction, in which the lamp is arranged, and the upward/downward direction does not always mean a vertical direction.

Figure 2:
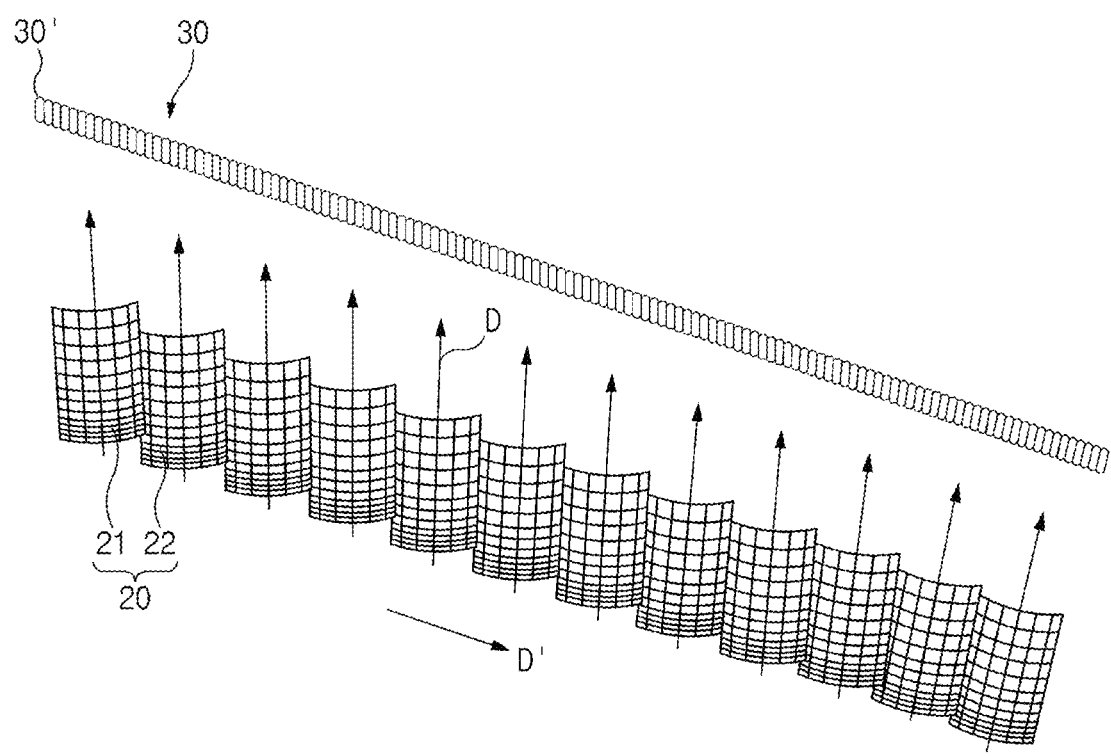
FIG. 2 is a view illustrating an appearance of the lamp for a vehicle of FIG. 1, when viewed from another direction.

FIG. 1 is a view conceptually illustrating a lamp for a vehicle according to an embodiment of the present disclosure. FIG. 2 is a view illustrating an appearance of the lamp for a vehicle of FIG. 1, when viewed from another direction.

The lamp for a vehicle according to an embodiment of the present disclosure may include a light emitting part 10, a light condensing part 20, and a refraction part 30. The light emitting part 10 may be a configuration for emitting light. As an example, the light emitting part 10 may be an LED. A plurality of light emitting parts 10 may be formed.

The light condensing part 20 may be a configuration for guiding the light emitted from the light emitting part 10 such that the light becomes parallel light. A plurality of light condensing parts 20 may be formed. As another example, the light condensing part 20 may be a collimator.

Figure 3:
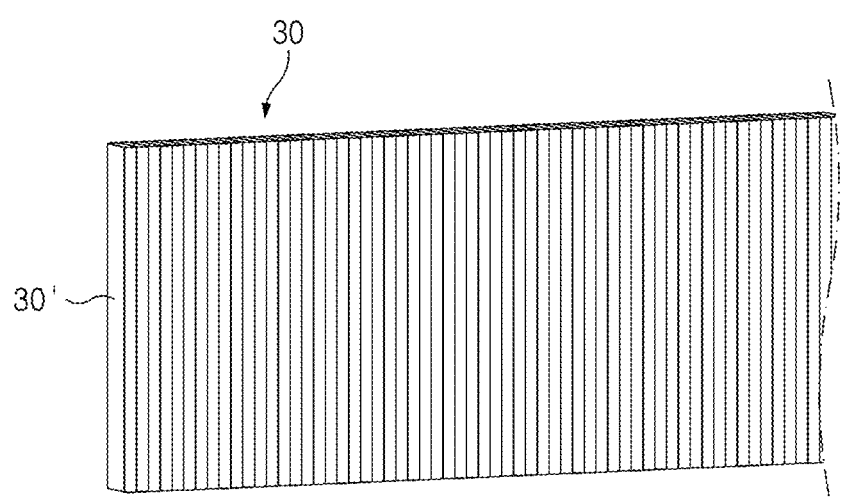
FIG. 3 is a view illustrating a refraction part.
Figure 4:
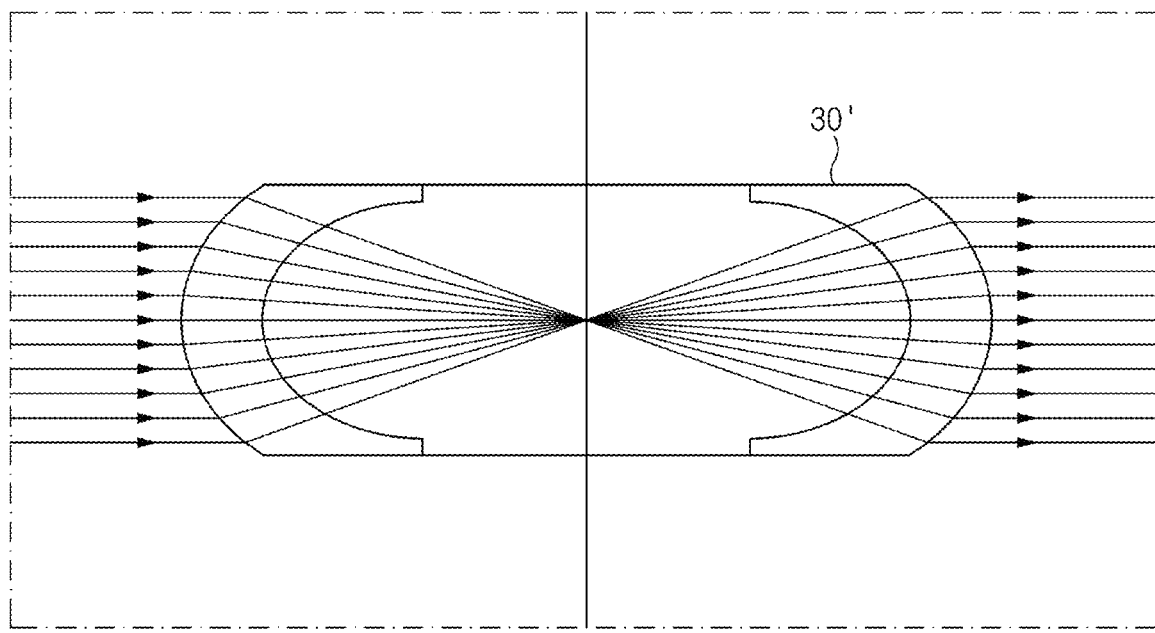
FIG. 4 is a view illustrating a refraction portion, a light path, in which light is introduced into the refraction portion, and a light path, in which the light is emitted from the refraction portion.

FIG. 3 is a view illustrating a refraction part. FIG. 4 is a view illustrating a refraction portion, a light path, in which light is introduced into the refraction portion, and a light path, in which the light is emitted from the refraction portion.

The refraction part 30 may be configured to refract the light emitted from the light condensing part 20. The refraction part 30 may include a plurality of refraction portions. The plurality of refraction portions 30' may be configured to refract the light emitted from the light condensing part 20 such that the light is parallel to a light emission direction "D". Here, the light emission direction "D" may mean a direction, in which the light emitted from the light condens-ing part 20 travels. The refraction portions 30' may be arranged along an arrangement direction D'. The arrangement direction D' may be a direction that crosses the light emission direction "D".

As an example, the refraction part 30 may be a fly eye lens. The fly eye lens may be a lens that refracts the parallel light that is introduced in parallel again such that the parallel light is parallel, and emits the parallel light. Here, an aspect that the parallel light introduced in parallel is refracted again such that the parallel light is parallel may mean that a light path before it is introduced into the lens and a light path, in which it is emitted after being refracted through the lens, are parallel. Then, the light path before it is introduced into the lens and the light path, in which it is emitted after being refracted through the lens, may be spaced apart from each other along a direction that is perpendicular to a direction of the light path before it is introduced.

According to the present disclosure, because the refraction part 30 that refracts the light such that the light is parallel to the direction, in which it is introduced, is utilized, the light travels while not being scattered and a contrast of a desired part may be adjusted whereby an ADB function may be advantageously implemented.

Meanwhile, to implement the ADB function, lights having different orientation angles are necessary. Hereinafter, a configuration of the lamp for a vehicle for implementing the function will be described in detail.

The light condensing part 20 may include a first light condensing member 21 and a second light condensing member 22. The first light condensing member 21 may guide the light emitted from the light emitting part 10 such that the light becomes parallel light along a first direction D1. The second light condensing member 22 may guide the light emitted from the light emitting part 10 such that the light becomes parallel light along a second direction D2 that is different from the first direction D1. The second light condensing member 22 may be disposed in the arrangement direction D' of the first light condensing member 21. Here, the first direction D1 and the second direction D2 may be directions corresponding to orientation angles, at which the light is to be emitted by the light condensing members.

Here, the description of first and second is made to describe a minimum unit, and it does not mean that the number of the light condensing members is limited to two. That is, a user may dispose a plurality of light condensing members, and thus direction of the lights emitted from the light condensing members may be plural.

Figure 5:
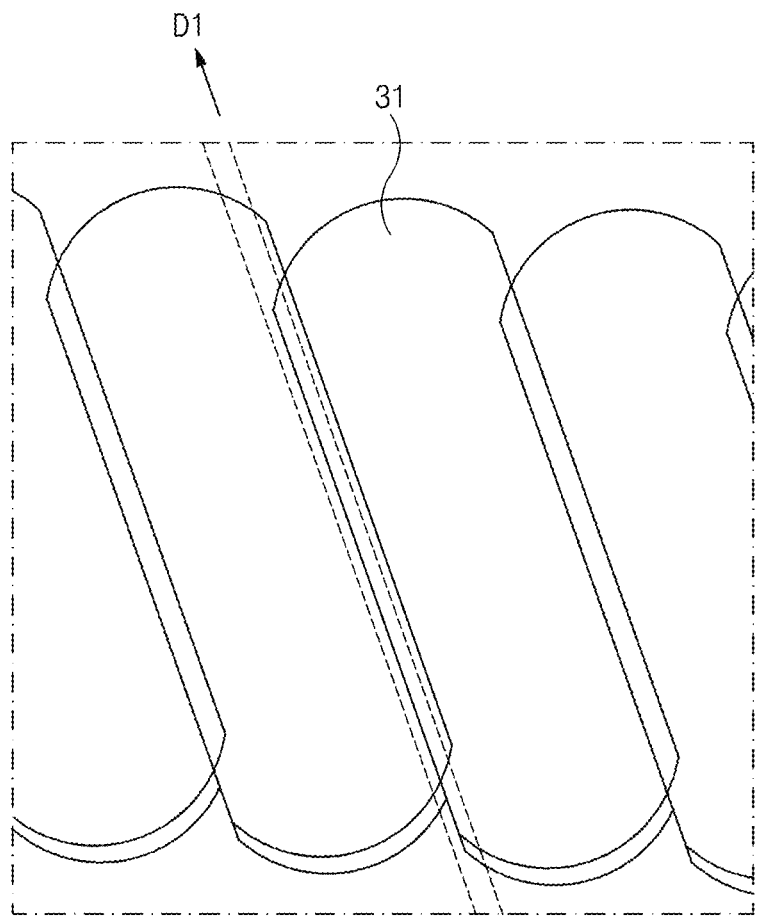
FIG. 5 is an enlarged view illustrating a first refraction portion.
Figure 6:
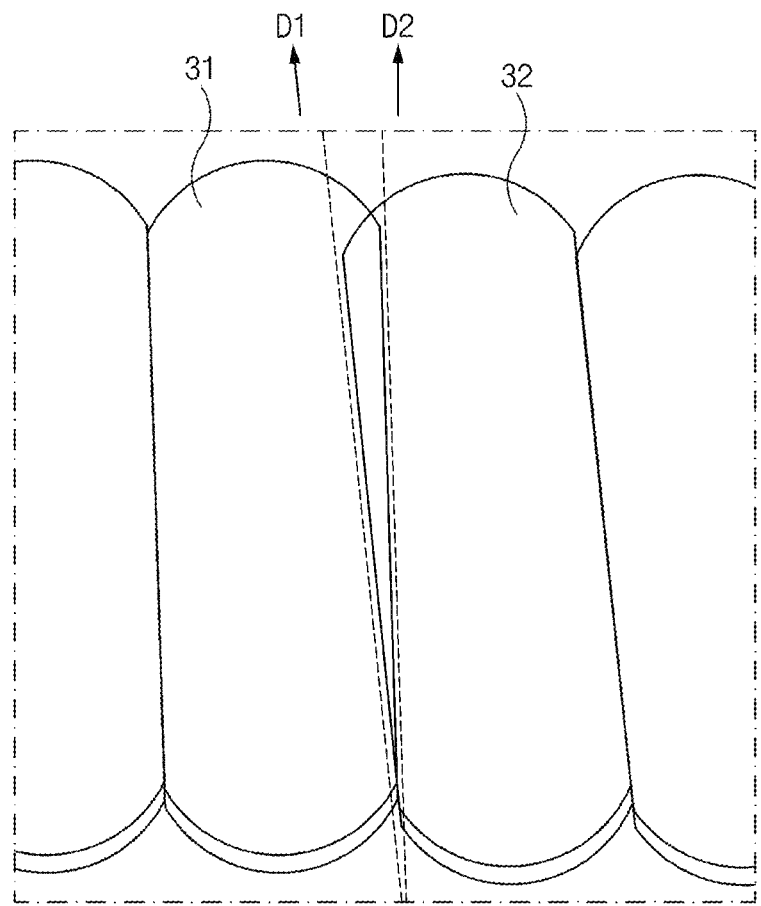
FIG. 6 is an enlarged view illustrating a first refraction portion and a second refraction portion.

FIG. 5 is an enlarged view illustrating a first refraction portion. FIG. 6 is an enlarged view illustrating the first refraction portion and a second refraction portion.

A first refraction portion 31 that is any one of the plurality of refraction portions 30' may be configured to refract the light emitted from the first light condensing member 21 such that the light is parallel to the first direction D1. The first refraction portion 31 may be one refraction portion 30', and may be a plurality of refraction portions 30'. A second refraction portion 32 that is another one of the plurality of refraction portions 30' may be configured to refract the light emitted from the second light condensing member 22 such that the light is parallel to the second direction D2. The second refraction portion 32 may be one refraction portion 30', and may be a plurality of refraction portions 30'. The second refraction portion 32 may be disposed in the arrangement direction D' of the first refraction portion 31.

Directions, in which, among the plurality of refraction portions 30', refraction portions 30' pertaining to the first refraction portion 31 extend, may correspond to each other.

Likewise, directions, in which, among the plurality of refraction portions 30', refraction portions 30' pertaining to the second refraction portion 32 extend, may correspond to each other.

The number of, among the plurality of refraction portions 30', the refraction portions 30' pertaining to the first refraction portion 31 and the number of, among the plurality of refraction portions 30', the refraction portions 30' pertaining to the second refraction portion 32 may correspond to each other. Furthermore, a direction, in which the first refraction portion 31 extends, may be parallel to the first direction D1, and a direction, in which the second refraction portion 32 extends, may be parallel to the second direction D2. An angle between the first direction D1 and the second direction D2 may be 0.5 degrees to 10 degrees.

Figure 7:
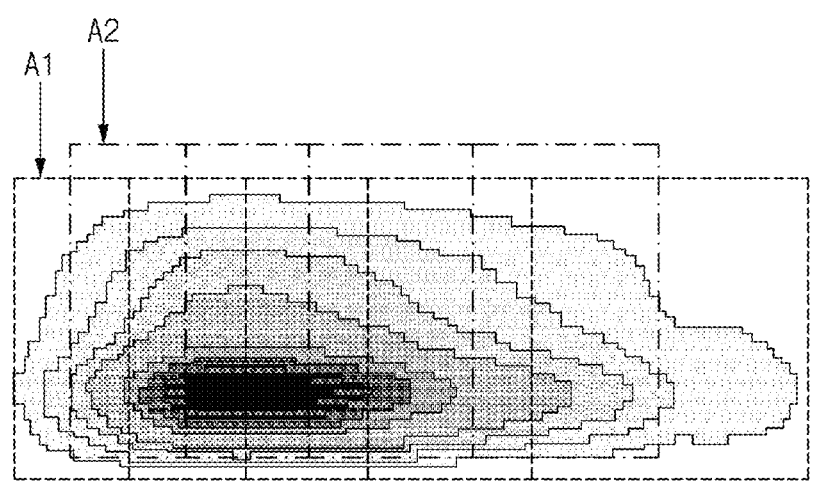
FIG. 7 is a view conceptually illustrating an irradiation area formed by a lamp for a vehicle according to an embodiment of the present disclosure.

FIG. 7 is a view conceptually illustrating an irradiation area formed by the lamp for a vehicle according to an embodiment of the present disclosure. Assume that an irradiation area formed when the light irradiated from the light emitting part 10 passes through the first light condensing member 21 and the first refraction portion 31 is a first irradiation area A1 and an irradiation area formed when the light irradiated from the light emitting part 10 passes through the second condensing member 22 and the second refraction portion 32 is a second irradiation area A2. A portion of the first irradiation area A1 may overlap the second irradiation area A2.

As an example, a center of the first irradiation area A1 and a center of the second irradiation area A2 may be spaced apart from each other along transverse and longitudinal directions. The first irradiation area A1 and the second irradiation area A2 may be irradiation area formed by lights having different orientation angles.

According to the present disclosure, because parallel lights may be emitted for the orientation angles while different disposition angles of the refraction portions 30' are formed according to the orientation angles, a contract part may be formed in a desired part. Accordingly, an ADB function and a hot zone forming function may be advantageously implemented.

As an example, when it is determined that a driver of the vehicle is located in a part formed in the second irradiation area A2, a dark part may be formed until the vehicle passes by the second irradiation area A2 by turning off a part of the light emitting part 10, which faces the second light condensing member 22. Thereafter, when the vehicle passes, a part of the light emitting part 10, which faces the second light condensing member 22, may be turned on again.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A lamp for a vehicle comprising:
   a light emitting part configured to emit light;
   a light condensing part configured to guide the light emitted from the light emitting part such that the light becomes parallel light, wherein the light condensing part comprises:
      a first light condensing member configured to guide the light emitted from the light emitting part such that the light becomes the parallel light along a first direction; and
      a second light condensing member configured to guide the light emitted from the light emitting part such that the light becomes the parallel light along a second direction different from the first direction, wherein the first direction and the second direction are not parallel; and
   a refraction part configured to refract the light emitted from the light condensing part,
   wherein the refraction part includes:
   a plurality of refraction portions configured to refract the light emitted from the light condensing part such that the light is parallel to a light emission direction, and
   wherein the refraction portions are arranged along an arrangement direction that is a direction that crosses the light emission direction.

2. The lamp of claim 1, wherein the second light condensing member is disposed in the arrangement direction.

3. The lamp of claim 1, wherein a first refraction portion of one of the plurality of refraction portions is configured to refract the light emitted from the first light condensing member such that the light is parallel to the first direction, and
   wherein a second refraction portion that is another one of the plurality of refraction portions is configured to refract the light emitted from the second light condensing member such that the light is parallel to the second direction.

4. The lamp of claim 3, wherein a number of refraction portions pertaining to the first refraction portion corresponds to a number of refraction portions pertaining to the second refraction portion.

5. The lamp of claim 3, wherein: a direction in which the first refraction portion extends is parallel to the first direction, and a direction in which the second refraction portion extends is parallel to the second direction.

6. The lamp of claim 3, wherein directions in which refraction portions pertaining to the first refraction portion extend correspond to each other and directions in which refraction portions pertaining to the second refraction portion extend correspond to each other.

7. The lamp of claim 3, wherein when an irradiation area formed when the light irradiated from the light emitting part passes through the first light condensing member and the first refraction portion is defined as a first irradiation area,
   when an irradiation area formed when the light irradiated from the light emitting part passes through the second light condensing member and the second refraction portion is defined as a second irradiation area, and
   a portion of the first irradiation area overlaps the second irradiation area.

8. The lamp of claim 1, wherein an angle between the first direction and the second direction is 0.5 degrees to 10 degrees.

9. The lamp of claim 1, wherein the refraction part is a fly eye lens.

* * * * *